(12) United States Patent
Rimer et al.

(10) Patent No.: US 8,782,062 B2
(45) Date of Patent: Jul. 15, 2014

(54) XML DATA MODEL FOR REMOTE MANIPULATION OF DIRECTORY DATA

(75) Inventors: Matthew S. Rimer, Kirkland, WA (US); Richa N. Kumar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 12/473,231

(22) Filed: May 27, 2009

(65) Prior Publication Data

US 2010/0306277 A1  Dec. 2, 2010

(51) Int. Cl.
G06F 7/00 (2006.01)
G06F 17/30 (2006.01)

(52) U.S. Cl.
USPC ........................................................ 707/756

(58) Field of Classification Search
USPC ........................................................ 707/756
See application file for complete search history.

(56) References Cited

U.S. PATENT DOCUMENTS

| | | | | |
|---|---|---|---|---|
| 6,901,410 | B2 * | 5/2005 | Marron et al. | 1/1 |
| 6,950,866 | B1 | 9/2005 | Lowry et al. | |
| 7,676,562 | B2 * | 3/2010 | Reistad et al. | 709/223 |
| 2002/0013790 | A1 * | 1/2002 | Vandersluis | 707/514 |
| 2002/0129000 | A1 | 9/2002 | Pillai et al. | |
| 2005/0144556 | A1 * | 6/2005 | Petersen et al. | 715/513 |
| 2008/0235281 | A1 | 9/2008 | Holm et al. | |
| 2009/0037446 | A1 | 2/2009 | Tonev et al. | |
| 2010/0299377 | A1 * | 11/2010 | Rimer et al. | 707/959 |

FOREIGN PATENT DOCUMENTS

| | | | | |
|---|---|---|---|---|
| JP | 2002366399 | * | 12/2002 | G06F 12/00 |
| WO | 0028437 A1 | | 5/2000 | |

OTHER PUBLICATIONS

Web Services Transfer (WS-Transfer) W3C Member Submission Sep. 27, 2006, Alexander et al., http://www.w3.org/Submission/WS-Transfer/.*
"[MS-WSPELD]: WS-Transfer and WS-Enumeration Protocol Extension for Lightweight Directory Access Protocol v3 Controls Specification ", Retrieved at<<http://download.microsoft.com/download/9/5/E/95EF66AF-9026-4BB0-A41D-A4F81802D92C/%5BMS-WSPELD%5D.pdf>>, Jan. 14, 2009, pp. 1-38.
Drew Adams, "Oracle XML DB", Retrieved at<<http://download.oracle.com/docs/cd/B19306_01/appdev.102/b14259.pdf>>, Aug. 2005, pp. 852.
"Directory Services Markup Language (DSML)", Retrieved at<<http://xml.coverpages.org/dsml.html>>, Nov. 30, 2001, pp. 26.
"Web Services Transfer (WS-Transfer)", Retrieved at<<http://www.w3.org/SubmissionWS-Transfer>>, Sep. 27, 2006, pp. 17.
"Web Services Enumeration (WS-Enumeration)", Retrieved at<<http://www.w3.org/Submission/WS-Enumeration/>>, Mar. 15, 2006, pp. 26.

(Continued)

*Primary Examiner* — Sherief Badawi
*Assistant Examiner* — Christy Lin
(74) *Attorney, Agent, or Firm* — Ben Tabor; Kate Drakos; Micky Minhas

(57) ABSTRACT

An XML data model and systems and methods for using the same are described herein that enable entities to interact with a remote directory service, such as an LDAP-style directory service, using industry standard Web services protocols that represent resources using XML, such as WS-Transfer and WS-Enumeration.

20 Claims, 8 Drawing Sheets

(56) References Cited

OTHER PUBLICATIONS

"OASIS Directory Services Markup Language TC", Retrieved at<<http://www.oasis-open.org/committees/dsml>>, pp. 2.

"MS-ADDM Protocol Document", Retrieved at<<http://download.microsoft.com/download/9/5/E/95EF66AF-9026-4BB0-A41D-A4F81802D92C/%5BMS-ADDM%5D.pdf>>, pp. 42.

* cited by examiner

800

Write relative distinguished name associated with object in directory based on XML element included within first representation of object

Move or place object within tree structure of directory based on XML element included within first representation of object, wherein XML element represents an identifier associated with object

FIG 9

XML DATA MODEL FOR REMOTE MANIPULATION OF DIRECTORY DATA

BACKGROUND

Directory services exist in the form of software systems that store, organize and provide access to information in a directory. As used herein, the term directory generally refers to a set of objects that are organized in a logical and hierarchical manner. Various protocols exist by which clients may interact with a directory service to perform operations with respect to objects in a directory, such as creating, deleting, updating or running queries against objects in the directory. For example, the Lightweight Directory Access Protocol (LDAP) is a protocol by which clients may interact with a directory service over a TCP connection. The LDAP protocol was designed by University of Michigan to provide access to the X.500 Directory while not incurring the resource requirements of the Directory Access Protocol (DAP). This makes it very suitable for use on the Internet. Generally speaking, in an LDAP-style directory service, the directory comprises a tree of directory objects, wherein each object consists of a set of attributes. An attribute has a name (an attribute type or attribute description) and one or more values. The attributes are defined in a schema.

It may be deemed desirable to implement systems in which clients can interact with a remote directory service, such as an LDAP-style directory service, over a network using industry standard Web services protocols. For example, it may be deemed desirable to enable clients to interact with a remote directory service using industry standard Web services protocols that represent resources using Extensible Markup Language (XML). Examples of such Web services protocols include, for example, SOAP-based protocols such as WS-Transfer and WS-Enumeration.

SOAP, which was originally defined as Simple Object Access Protocol, is a protocol specification for exchanging structured information in the implementation of Web Services in computer networks. SOAP relies on XML as its message format, and usually relies on other application layer protocols (most notably Hypertext Transfer Protocol (HTTP)) for message negotiation and transmission. SOAP can form the foundation layer of a Web services protocol stack, providing a basic messaging framework upon which Web services can be built.

WS-Transfer describes a SOAP-based protocol for accessing XML representations of Web service-based resources. WS-Transfer defines how to invoke a simple set of familiar verbs (Get, Create, Put, and Delete) using SOAP. An application protocol may be constructed to perform these operations over resources. WS-Transfer is described in more detail at http://www.w3.org/Submission/WS-Transfer.

WS-Enumeration describes a SOAP-based protocol for enumerating a sequence of XML elements. WS-Enumeration enables an application to provide an enumeration message to a Web service, requesting a representation of all objects that match designated criteria. The Web service responds to the enumeration message with an enumeration context, which may be used by the application to retrieve the objects that match the designated criteria. In this way, WS-Enumeration is useful for reading event logs, message queues, streaming, or other applications for which a simple single-request/single-reply metaphor is insufficient for transferring large data sets over SOAP. WS-Enumeration is described in more detail at http://www.w3.org/Submission/WS-Enumeration.

Although it may be deemed desirable to enable clients to interact with a remote directory service, such as an LDAP-style directory service, using industry standard Web services protocols that represent resources using XML as noted above, industry standard Web services protocols such as WS-Transfer and WS-Enumeration do not specify how LDAP-style directory data should be modeled in XML.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An XML data model and systems and methods for using the same are described herein that enable clients to interact with a remote directory service, such as an LDAP-style directory service, using industry standard Web services protocols that represent resources using XML, such as WS-Transfer and WS-Enumeration.

In particular, a computer-implemented method for providing an object responsive to receiving a Web services protocol request message from an entity over a network is described herein. The Web services protocol is for accessing resources represented using XML. In accordance with the method, a first representation of the object is accessed in a directory. The first representation of the object is organized in accordance with a hierarchical data model. A second representation of the object organized in accordance with an XML data model is then generated based on at least the first representation of the object by at least generating a first XML element that represents a most derived structural object class associated with the first representation of the object and generating one or more second XML elements nested within the first XML element, each of the one or more second XML elements naming a respective attribute associated with the first representation of the object. Then, a Web services protocol response message that includes the second representation of the object is transmitted to the entity over the network.

In accordance with one implementation of the foregoing method, the Web services protocol request message comprises a WS-Transfer Get request message and the Web services protocol response message comprises a WS-Transfer GetResponse message. In accordance with another implementation of the foregoing method, the Web services protocol request message comprises a WS-Enumeration Pull request message and the Web services protocol response message comprises a WS-Enumeration PullResponse message.

In one embodiment, the step of accessing a first representation of the object in a directory comprises accessing the first representation of the object using LDAP.

In a further embodiment, generating the second representation of the object based on at least the first representation of the object further includes generating one or more third XML elements nested within one of the one or more second XML elements, each of the one or more third XML elements representing a value associated with the attribute named by the one of the one or more second XML elements.

In a still further embodiment, generating the second representation of the object based on at least the first representation of the object includes generating an XML element corresponding to each of one or more synthetic attributes associated with the object that are not included within the first representation of the object.

A computer-implemented method for writing an object responsive to receiving a Web services protocol request message from an entity over a network is also described herein.

The Web services protocol is for accessing resources represented using XML. In accordance with the method, a first representation of the object included within the Web services protocol request message is obtained. The first representation of the object is organized in accordance with an XML data model. A second representation of the object organized in accordance with a hierarchical data model is then generated based on the first representation of the object by at least determining a most derived structural object class associated with the second representation of the object based on a first XML element included within the first representation of the object and determining one or more attributes associated with the second representation of the object named by one or more respective second XML elements nested within the first XML element. The object is then written in a directory based on the second representation of the object.

In accordance with one implementation of the foregoing method, the Web services protocol request message comprises a WS-Transfer Put request message. In accordance with another implementation of the foregoing method, the Web services protocol request message comprises a WS-Transfer Create request message.

In one embodiment, the step of writing the object in the directory comprises accessing the directory using LDAP.

In a further embodiment, generating the second representation of the object based on the first representation of the object further includes determining one or more values associated with an attribute named by one of the one or more second XML elements based on one or more third XML elements nested within the one of the one or more second XML elements.

The foregoing method may further include writing a relative distinguished name associated with the object in the directory based on an XML element included within the first representation of the object. The foregoing method may also include placing or moving the object within a tree structure of the directory based on an XML element included within the first representation of the object, wherein the XML element names an identifier that is associated with the object.

A system is also described herein. The system includes a Web services interface, directory service logic and conversion logic. The Web services interface is configured to receive a first Web services protocol request message from an entity over a network, the Web services protocol for accessing resources represented using XML. The directory service logic is configured to access a first representation of a first object identified in the first Web services protocol request message in an LDAP directory, the first representation of the first object being organized in accordance with a hierarchical data model. The conversion logic is configured to generate a second representation of the first object based on at least the first representation of the first object. The second representation of the first object includes a first XML element that represents a most derived structural object class associated with the first representation of the first object and one or more second XML elements nested within the first XML element, each of the one or more second XML elements naming a respective attribute associated with the first representation of the first object. The Web services interface is further configured to transmit a Web services protocol response message including the second representation of the first object to the entity over the network.

In one implementation of the foregoing system, the Web services interface is further configured to receive a second Web services protocol request message from the entity over the network. In accordance with such an implementation, the conversion logic is further configured to obtain a first representation of a second object included within the second Web services protocol request, the first representation of the second object being organized in accordance with the XML data model, and to generate a second representation of the second object organized in accordance with the hierarchical data model. The conversion logic is configured to generate the second representation of the second object by at least determining a most derived structural object class associated with the second representation of the second object based on a first XML element included within the first representation of the second object and determining one or more attributes associated with the second representation of the second object named by one or more respective second XML elements nested within the first XML element included within the first representation of the second object. In further accordance with such an implementation, the directory service logic is further configured to write the second object in the LDAP style directory based on the second representation of the object.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE
DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 8 depicts a step that may optionally be performed as part of the method represented by the flowchart of FIG. 6.

FIG. 9 depicts a further step that may optionally be performed as part of the method represented by the flowchart of FIG. 6.

Figure 1:
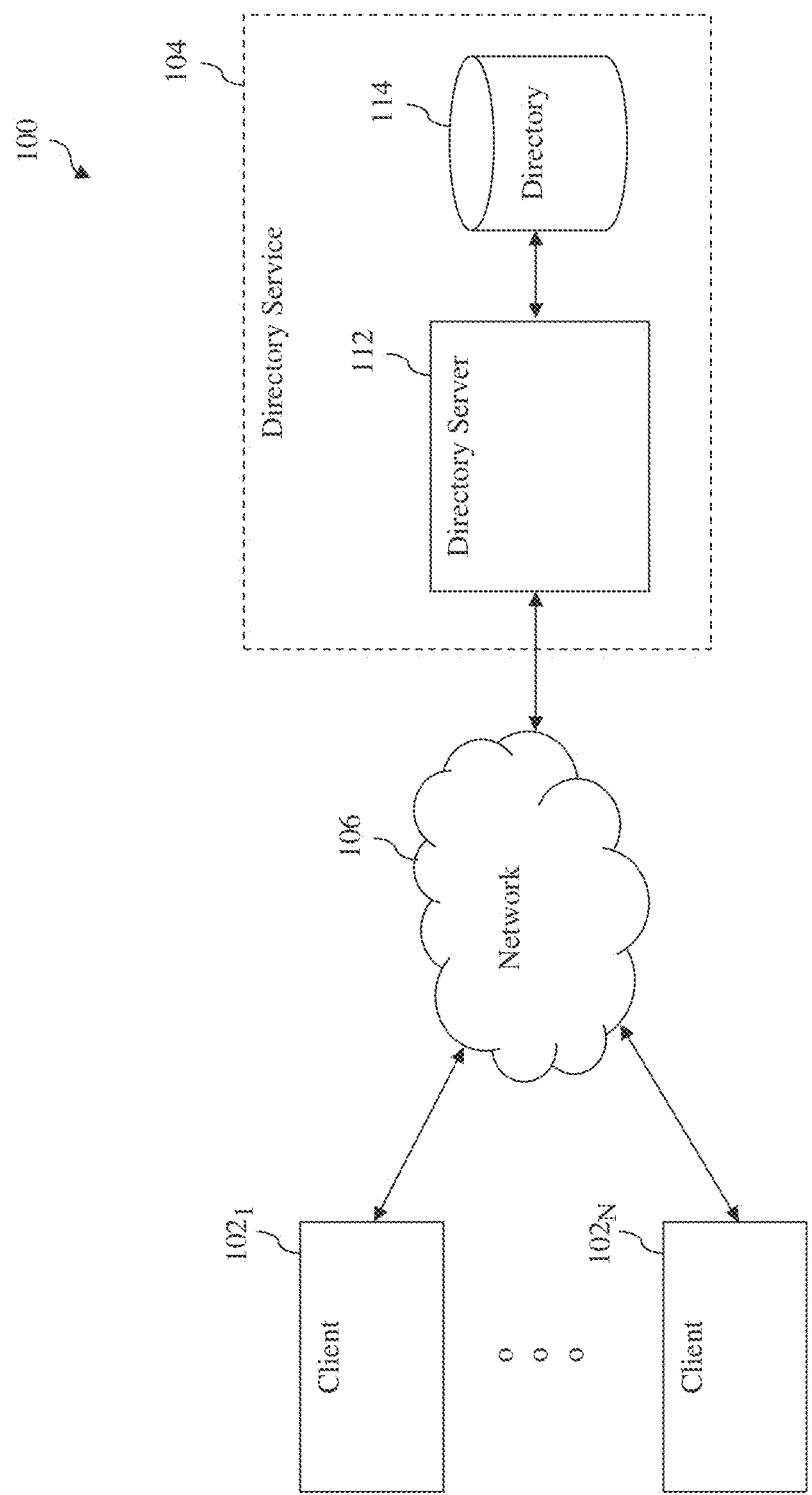
FIG. 1 is a block diagram of an example system in which an embodiment of the present invention may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example System Implementation

FIG. 1 is a block diagram of an example system 100 in which an embodiment of the present invention may operate. As shown in FIG. 1, system 100 includes a directory service 104 that is accessible to a plurality of clients $102_1$-$102_N$ via a network 106. As further shown in FIG. 1, directory service 104 comprises a directory server 112 and a directory 114.

Directory 114 represents a set of objects that are organized in a logical and hierarchical manner and that are stored on one or more physical storage devices. Objects stored in directory 114 or intended for storage in directory 114 may be referred to herein as directory objects. In one embodiment, directory 114 comprises an LDAP directory, which is to say that the objects in directory 114 are represented in accordance with a hierarchical data model that facilitates access to and manipulation of the objects using the well-known LDAP protocol. In accordance with such an embodiment, directory 114 comprises a tree of objects, wherein each object consists of a set of attributes. An attribute has a name (an attribute type or attribute description) and one or more values. The attributes are defined in a schema.

Directory server 112 is an entity that is configured to receive request messages from clients $102_1$-$102_N$ via network 106 and to perform operations with respect to data stored in directory 114 responsive to receiving such request messages. Performing an operation with respect to data stored in directory 114 may include, for example, creating, deleting, updating or running queries against objects in directory 114. Directory server 112 is also configured to send one or more response messages to a client $102_1$-$102_N$ via network 106 responsive to receiving certain request messages or request message types.

In an embodiment, each client $102_1$-$102_N$ is configured to generate request messages to directory server 112 that are encoded in accordance with a Web services protocol and directory server 112 is configured to generate corresponding response messages that are encoded with the same Web services protocol. Such an embodiment is depicted in FIG. 2.

Figure 2:
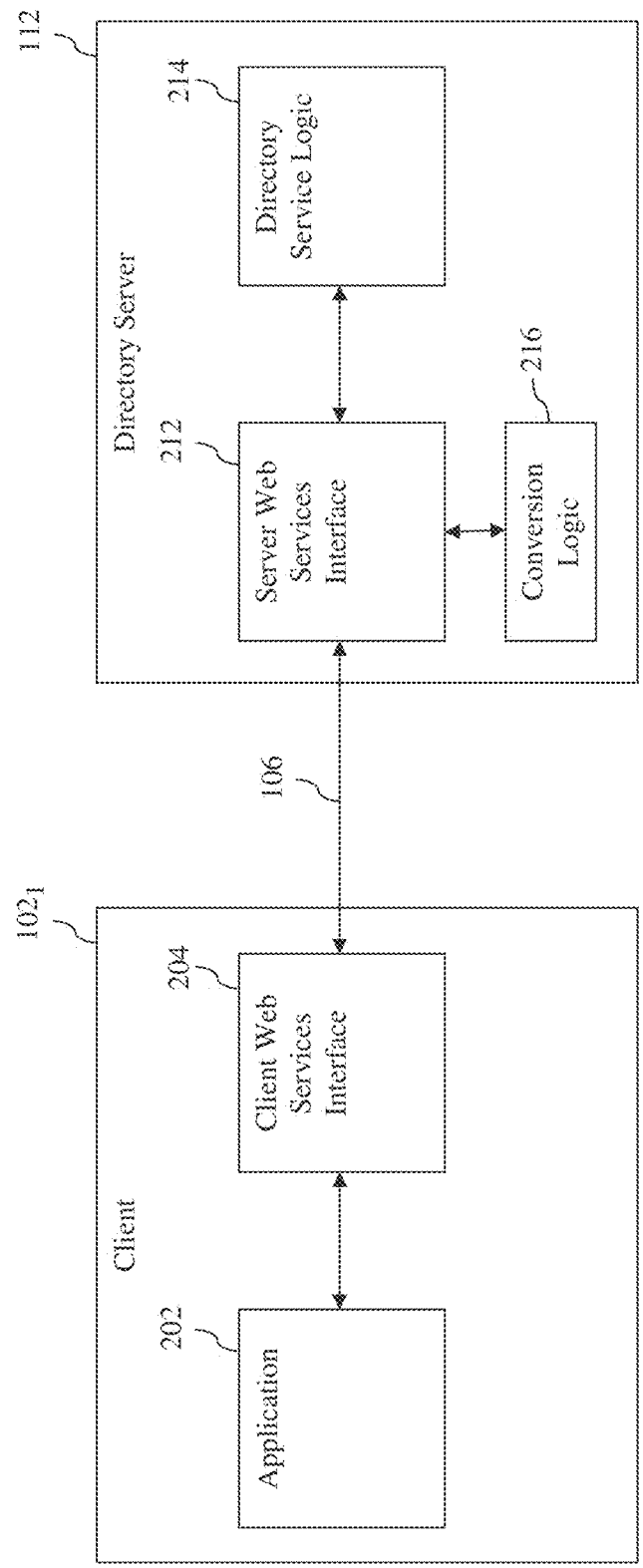
FIG. 2 is a block diagram that provides a more detailed depiction of one of the clients and the directory server represented in FIG. 1.

As shown in FIG. 2, a representative client 102, comprises an application 202 and a client Web services interface 204. Application 202 is configured to generate directory service requests for directory server 112. Client Web services interface 204 is configured to encode such directory service requests in accordance with a Web services protocol to generate Web services protocol request messages and to transmit such messages to directory server 112 over network 106. Client Web services interface 204 is also configured to receive Web services protocol response messages from directory server 112 via network 106 and to decode such messages to provide directory service responses that may be processed by application 202. Depending upon the implementation, the Web services protocol messages generated and processed by client Web services interface 204 may comprise messages encoded in accordance with the SOAP Web services protocol as well as messages encoded in accordance with Web services protocols built on SOAP, such as WS-Transfer or WS-Enumeration.

As further shown in FIG. 2, an implementation of directory server 112 includes a server Web services interface 212, directory service logic 214 and conversion logic 216. Server Web services interface 212 is configured to receive Web services protocol request messages from client 102, via network 106 and to decode such messages to produce directory service requests that are suitable for processing by directory service logic 214. Directory service logic 214 is configured to receive directory service requests from server Web services interface 212 and, when appropriate, perform certain operations against data in directory 114 in accordance with those requests.

Directory service logic 214 is also configured to generate directory service responses, when appropriate, to certain directory service requests received from server Web services interface 212. Server Web services interface 212 is further configured to encode such directory service responses in accordance with a Web services protocol to generate Web services protocol response messages and to transmit such messages to client $102_1$ over network 106.

In an embodiment, server Web services interface 212 is advantageously configured to decode Web services protocol request messages received from client $102_1$ that are encoded in accordance with a Web services protocol that represents resources using XML. Examples of such Web services protocols include, for example, SOAP-based protocols such as WS-Transfer and WS-Enumeration. The Web services protocol request messages are decoded to provide directory service requests that are formatted in accordance with a directory service protocol and are thus suitable for processing by directory service logic 214. In an embodiment, the directory service protocol comprises the LDAP protocol, although this is only an example.

In further accordance with such an embodiment, server Web services interface 212 is also advantageously configured to encode directory service response messages received from directory service logic 214 that are formatted in accordance with a directory service protocol, such as LDAP, to produce Web services protocol response messages that are encoded in accordance with a Web services protocol that represents resources using XML, such as WS-Transfer and WS-Enumeration.

To decode Web services protocol request messages that include an XML representation of data stored or to be stored in directory 114, server Web services interface 212 is configured to access conversion logic 216. Conversion logic 216 is configured to convert the XML representation of the directory data into a representation that is suitable for processing by directory service logic 214. In one embodiment, this function comprises converting a representation of a directory object that is organized in accordance with an XML data model to a representation that is organized in accordance with a hierarchical data model, such as an LDAP data model.

Server Web services interface 212 is also configured to access conversion logic 216 to encode directory service responses that include a representation of directory data that is suitable for processing by directory service logic 214. Conversion logic 216 is configured to convert the representation of the directory data suitable for processing by directory service logic 214 into an XML representation that can be included within a Web services protocol response message. In one embodiment, this function comprises converting a representation of a directory object that is organized in accordance with a hierarchical data model, such as an LDAP data model, into a representation that is organized in accordance with an XML data model.

Conversion logic 216 thus allows client 102$_1$ to interact with a directory service, such as directory service 104, that represents objects in accordance with a hierarchical data model (such as an LDAP data model) using Web services protocols that represent resources using an XML data model. One example of an XML data model that may advantageously be used to represent directory data will be described in detail below in Section C. Example Web services protocol messages that include directory objects represented in accordance with such a model will be presented below in Section D. Example methods by which directory server 112 uses an XML data model to process Web services protocol request and response messages will be described below in Section E.

It is noted that, depending upon the implementation, client 102$_1$ may also include conversion logic. Such conversion logic may be invoked by client Web services interface 204 to convert XML representations of directory data that are included in Web services protocol response messages received from directory server 112 into representations that are suitable for processing by application 202 and between representations of directory data that are suitable for processing by application 202 into XML representations of directory data that are suitable for inclusion within a Web services protocol request message to be transmitted to directory server 112.

It is noted with respect to the foregoing system that each client 102$_1$-102$_N$ as well as directory server 112 may be implemented using a processor-based computer system, although the present invention is not limited in that regard. One example of a processor-based computer system that may be used to implement aspects of the present invention is described below in Section F.

Although directory service 104 is shown as including only a single directory server 112 and a single directory 114, it is noted that directory service 104 may include any number of directory servers 112 and directories 114.

Directory server 112 may represent both a processor-based computer system configured to perform the functions of directory server 112 as described herein, as well as one or more computer programs configured to perform such functions when executed upon such a processor-based computer system. In an embodiment in which directory server 112 comprises a software-implemented entity, multiple instances of directory server may be implemented on a single physical machine.

Directory 114 may be stored in a single physical memory device or across multiple physical memory devices. Such physical memory device(s) may be integrated within a machine used to implement directory server 112 or externally connected thereto via a network connection or other suitable interface.

Network 106 is intended to represent a packet-switched network and may comprise one or more wide area networks, local area networks, private networks, public networks, wired or wireless networks.

C. Example XML Data Model

This section provides one example of how conversion logic 216 may represent or interpret directory objects in XML. For the purposes of this example, it is assumed that directory 114 comprises an LDAP directory, that each object in directory 114 comprises a collection of LDAP attributes, and that each LDAP attribute contains or is otherwise associated with one or more values. However, the invention is not limited to LDAP directories.

The XML data model described in this section may be thought of as providing an XML view of objects stored in directory 114. As discussed above in Section B, such an XML view may advantageously be used to convey information about the objects via Web services protocols that represent resources using XML.

1. Object Naming

In accordance with this example, it is assumed that each object in directory 114 is identified by a unique property referred to as an object reference property. The object reference property may be either a globally unique identifier (GUID) or an LDAP distinguished name associated with the object. As will be appreciated by persons skilled in the relevant art(s), an LDAP distinguished name of an object consists of the name of the object itself (called the relative distinguished name) as well as the names, in order from bottom to top, of the objects above it in the LDAP directory.

A client can include an object reference property (in either GUID or distinguished name form) in a Web services protocol request message to identify an object in directory 114 that should be operated on by an operation specified in that message. Directory server 112 can provide an object reference property in a Web services protocol response message to indicate the identity of an object in directory 114 that is returned in that response message. Depending upon the implementation, directory server 112 may be configured to return the object reference property as either a GUID or a distinguished name and is not constrained to return one or the other form exclusively.

In further accordance with this example, directory 114 includes a top-most entry that is referred to as the root DSA-specific Entry (DSE). The root DSE has a distinguished name that is the empty string. However, since each object in directory 114 must also be associated with a GUID, directory server 112 associates a fixed GUID with the root DSE. When a client intends to perform an operation against the root DSE and desires to specify the object to be operated on using the GUID form, the client is required to specify the fixed GUID. For example, the fixed GUID may be all ones: {11111111-1111-1111-1111-111111111111}.

2. XML View of Directory Objects

The example XML view of an object in directory 114 includes a number of XML elements, wherein the XML elements are named for LDAP classes and attributes used in the object. Additionally, the XML elements are also used to represent certain synthetic attributes associated with the object, which will be described in the next section.

In the example XML view, a single LDAP attribute and its value(s) are represented as follows. Let A be the LDAP display name of an LDAP attribute that has values V1(A) . . . Vn(A). Let S1(A) . . . Sn(A) be the XML representation of values V1 . . . Vn. Let LDAPSYN(A) be the LDAP syntax of attribute A, and let XMLSYN(A) be the corresponding XML syntax, as will be described in section C.4. The XML representation for this attribute is the following:

```
<addata:A LdapSyntax="LDAPSYN(A)">
    <ad:value xsi:type="XMLSYN(A)">
        S1(A)
    </ad:value>
    ...
    ...
    <ad:value xsi:type="XMLSYN(A)">
        Sn(A)
    </ad:value>
</addata:A>
```

Note that in the example XML representations provided herein, each XML element includes a name, zero or more XML attributes associated with the element, and, optionally, element contents. The XML element name indicates the element type and may optionally include a prefix that represents an XML namespace to which the element type belongs. The XML element contents may optionally comprise one or more additional XML elements or textual contents. Thus, for example, the foregoing XML representation of LDAP attribute A includes an XML element named "addata:A," wherein "A" is the name of the element type and the prefix "addata" represents a particular XML namespace to which element type "A" belongs. (In various examples described herein, the prefix "ad" refers to the XML namespace "http://schemas.microsoft.com/2008/1/ActiveDirectory" and the prefix "addata" refers to the namespace http://schemas.microsoft.com/2008/1/ActiveDirectory/Data). This element has an XML attribute denoted "LdapSyntax" and includes XML element contents in the form of a series of XML elements named "value."

The manner in which this XML view may be extended to an entire object in directory 114 will now be described. Let O be an object in directory 114. Let C be the LDAP display name of a most derived structural object class of O. The most derived structural object class, also referred to as the most specific structural object class, relates to the structural object class that has been defined in the associated XML namespace and typically has one or more elements or attributes associated with it. Let A1 . . . An be the LDAP display names of all the LDAP attributes of O. Then, the representation of O as the XML view in the example data model is the following:

```
<addata:C>
    <addata:A1 LdapSyntax="LDAPSYN(A1)">
        <ad:value xsi:type="XMLSYN(A1)">
            S1(A1)
        </ad:value>
        ...
        ...
        <ad:value xsi:type="XMLSYN(A1)">
            Sn(A1)
        </ad:value>
    </addata:A1>
    ...
    ...
    <addata:An LdapSyntax="LDAPSYN(An)">
        <ad:value xsi:type="XMLSYN(An)">
            S1(An)
        </ad:value>
        ...
        ...
        <ad:value xsi:type="XMLSYN(An)">
            Sn(An)
        </ad:value>
    </addata:An>
</addata:C>
```

In the foregoing example, the root XML element is named for the LDAP display name of the most derived structural object class of O and belongs to the XML namespace represented by the prefix "addata". In one implementation, directory server 112 may substitute "top" for the name of the root XML element if the LDAP display name of the most derived object class is not available. In a further implementation, directory server 112 represents the LDAP root DSE by using "top" for the name of the XML root element.

Generally speaking, if a first XML element is nested one level below a second XML element, the first XML element may be referred to as the child of the second XML element and the second XML element may be referred to as the parent of the first XML element. In the foregoing example, each child XML element of the root XML element represents a single LDAP attribute stored on object O and is named for that attribute's LDAP display name. Each such XML element belongs to the XML namespace represented by the prefix "addata". Each child XML element of the root XML element also has an XML attribute "LdapSyntax" that specifies a particular LDAP syntax associated with the LDAP attribute.

Each child XML element of an XML element representing an LDAP attribute represents a single value stored in that LDAP attribute. Each such child XML element has an XML attribute "xsi:type" that specifies a particular XML syntax associated with the value. The actual value is represented as a text node under this "ad:value" element.

Depending upon the implementation, clients may be allowed to omit the "LdapSyntax" XML attribute when sending a Web services protocol request message to directory server 112 that includes the above XML representation of a directory object. However, it may be deemed advantageous to configure directory server 112 to always include the "LdapSyntax" XML attribute when returning a Web services protocol response message that includes the above XML representation of a directory object.

In further accordance with the foregoing example XML data model, multiple objects in directory 114 are represented as sibling XML elements, regardless of the hierarchical relationship between the objects in the LDAP directory tree.

3. Synthetic Attributes

In addition to representing the LDAP attributes of an object in directory 114, the XML view of that object may also represent additional attributes that are not part of that object's representation stored by directory service 104. In other words, the additional attributes are generated by directory server 112. These additional attributes are referred to herein as synthetic attributes. In one implementation, the synthetic attributes can be distinguished from LDAP attributes because the elements that represent the synthetic attributes have names that are in a different XML namespace than the XML namespace that is used for LDAP attributes and classes. In a further implementation, the "LdapSyntax" XML attribute is never included in the XML representation of a synthetic attribute.

Examples of different synthetic attributes that may be represented within the XML view are described in the following sub-sections.

a. Object Reference Property

In an embodiment, an object reference property synthetic attribute contains the object reference property of the directory object, as previously described in Section C.1. The XML element used to represent the object reference property may be named, for example, "ad:objectReferenceProperty" and values of this synthetic attribute may have an XML syntax attribute equal to "xsd:string".

In a further embodiment, directory server 112 treats the object reference property synthetic attribute as a read-only attribute. In accordance with such an embodiment, directory server 112 is configured to cause any Web services protocol operations that attempt to change the value of the object reference property synthetic attribute to fail. Directory server 112 may be further configured to return a fault message to the client requesting the operation.

Depending upon the implementation, directory server 112 may omit the object reference property synthetic attribute in Web services protocol response message if the object reference property is not available.

The following is an example representation of the object reference property synthetic attribute as it would be found in the XML view of an object in directory 114. In this example, the object reference property is in the GUID form.

```
<ad:objectReferenceProperty>
    <ad:value xsi:type="xsd:string">
        e4f8a504-d7df-4b63-a636-5642d3bf1cf6
    </ad:value>
</ad:objectReferenceProperty>
``` b. Container-Hierarchy-Parent

In an embodiment, a container-hierarchy-parent synthetic attribute contains the object reference property of the parent object of the object in the LDAP directory tree. If the object has no parent, this synthetic attribute is omitted from the XML view of the object. The XML element used to represent the container-hierarchy-parent may be named, for example, "ad:container-hierarchy-parent" and values of this synthetic attribute may have an XML syntax attribute equal to "xsd: string".

In a further embodiment, directory server 112 treats a Web services protocol request message to write to this synthetic attribute as a request to move the object against which the write is being performed. In particular, directory server 112 is configured to move the object within directory 114 such that it is located under the object whose object reference property is specified as the new value of the container-hierarchy-parent synthetic attribute. Examples of Web services protocol request messages that may attempt to write to this synthetic attribute include, but are not limited to, a WS-Transfer Create request message and a WS-Transfer Put request message.

The following is an example representation of the container-hierarchy-parent synthetic attribute as it would be found in the XML view of an object in directory 114. In this example, the object reference property is in the GUID form.

```
<ad:container-hierarchy-parent>
    <ad:value xsi:type="xsd:string">
        d8f7a25a-26f5-4463-bbe3-aa01e4002afd
    </ad:value>
</ad:container-hierarchy-parent>
``` c. Distinguished Name

In an embodiment, a distinguished name synthetic attribute contains the LDAP distinguished name of the directory object, as previously described in Section C.1. The XML element used to represent the distinguished name synthetic attribute may be named, for example, "ad:distinguishedName" and values of this synthetic attribute may have an XML syntax attribute equal to "xsd:string".

In a further embodiment, directory server 112 treats the distinguished name synthetic attribute as a read-only attribute. In accordance with such an embodiment, directory server 112 is configured to cause any Web services protocol operations that attempt to change the value of the distinguished name synthetic attribute to fail. Directory server 112 may be further configured to return a fault message to the client requesting the operation.

The following is an example representation of the distinguished name synthetic attribute as it would be found in the XML view of an object in directory 114.

```
<ad:distinguishedName>
    <ad:value xsi:type="xsd:string">
        CN=Test,DC=fabrikam,DC=com
    </ad:value>
</ad:distinguishedName>
``` d. Relative Distinguished Name

In an embodiment, a relative distinguished name synthetic attribute contains the relative distinguished name of the directory object, as previously described in Section C.1. The XML element used to represent the relative distinguished name synthetic attribute may be named, for example, "ad:relativeDistinguishedName" and values of this synthetic attribute may have an XML syntax attribute equal to "xsd:string".

In a further embodiment, directory server 112 treats a Web services protocol request message to write to this synthetic attribute as a request to change the relative distinguished name of the object against which the write is being performed (that is, to rename the directory object). Examples of Web services protocol request messages that may attempt to write to this synthetic attribute include, but are not limited to, a WS-Transfer Create request message and a WS-Transfer Put request message.

The following is an example representation of the relative distinguished name synthetic attribute as it would be found in the XML view of an object in directory 114.

```
<ad:relativeDistinguishedName>
    <ad:value xsi:type="xsd:string">
        CN=Test
    </ad:value>
</ad:relativeDistinguishedName>
```

4. Syntax Mapping

As described above in Section C.2, the content of an "<ad:value>" XML element is the value of an LDAP directory attribute (or synthetic attribute) represented as an XML value. In one embodiment, for LDAP directory attributes, the choice of the XML syntax for this value (and thus, the corresponding textual representation of that XML value) is dependent on the attribute syntax of the LDAP directory attribute. One example mapping is specified below in Table 1, wherein the attribute syntaxes are specified in the MICROSOFT ACTIVE DIRECTORY Technical Specification [MS-ADTS], published by Microsoft Corporation of Redmond, Wash. (Feb. 23, 2009) and available at http://www.msdn.com. LDAPSYN and XMLSYN refer to the variables of the same names used in section C.2.

TABLE 1

| LDAP Attribute Syntax | LDAPSYN | XML Syntax (XMLSYN) |
|---|---|---|
| Boolean | Boolean | xsd:string |
| Enumeration | Enumeration | xsd:string |
| Integer | Integer | xsd:string |
| LargeInteger | LargeInteger | xsd:string |
| Object(Access-Point) | AccessPoint | xsd:string |
| Object(DN-String) | DNString | xsd:string |
| Object(OR-Name) | ORName | xsd:string |
| Object(DN-Binary) | DNBinary | xsd:string |
| Object(DS-DN) | DSDNString | xsd:string |
| Object(Presentation-Address) | PresentationAddress | xsd:string |
| Object(Replica-Link) | ReplicaLink | xsd:base64Binary |
| String(Case) | CaseString | xsd:string |
| String(IA5) | IA5String | xsd:string |
| String(NT-Sec-Desc) | NTSecurityDescriptor | xsd:base64Binary |
| String(Numeric) | NumericString | xsd:string |
| String(Object-Identifier) | ObjectIdentifier | xsd:string |
| String(Octet) | OctetString | xsd:base64Binary |
| String(Printable) | PrintableString | xsd:string |
| String(Sid) | SidString | xsd:base64Binary |
| String(Teletex) | TeletexString | xsd:string |
| String(Unicode) | UnicodeString | xsd:string |
| String(UTC-Time) | UTCTimeString | xsd:string |
| String(Generalized-Time) | GeneralizedTimeString | xsd:string |

In one implementation, the LDAP directory attributes located on the LDAP root DSE do not have LDAP attribute syntaxes defined for them. In order to address this issue, in an embodiment, directory server 112 is configured to define a mapping between the LDAP root DSE attributes and corresponding XML syntaxes.

For the various synthetic attributes described above, an example XML syntax is specified below in the Table 2.

TABLE 2

| Synthetic Attribute | XML Syntax (XMLSYN) |
|---|---|
| ad:objectReferenceProperty | xsd:string |
| ad:container-hierarchy-parent | xsd:string |
| ad:distinguishedName | xsd:string |
| ad:relativeDistinguishedName | xsd:string |

D. Example Web Services Protocol Messages

This section contains example Web services protocol messages that include an XML view of a directory object in accordance with an embodiment of the present invention. These messages may be transmitted or received, for example, by server Web services interface 212 of directory server 112. The XML views included therein may be generated or interpreted, for example, by conversion logic 216 of directory server 112. Although the examples in this section pertain to the WS-Transfer and WS-Enumeration Web services protocols, embodiments of the present invention may be used in conjunction with other Web services protocols.

1. WS-Transfer Get Example

The following example illustrates a WS-Transfer Get operation. Both a WS-Transfer Get request message and a WS-Transfer GetResponse message are shown. This example retrieves a complete XML view of a directory object.

The following is the WS-Transfer Get request message:

```
<soapenv:Envelope
    xmlns:wsa="http://www.w3.org/2005/08/addressing"
    xmlns:soapenv="http://www.w3.org/2003/05/soap-envelope">
    <soapenv:Header>
        <wsa:Action soapenv:mustUnderstand="1">
            http://schemas.xmlsoap.org/ws/2004/09/transfer/Get
        </wsa:Action>
        <objectReferenceProperty
            xmlns="http://schemas.microsoft.com/2008/1/
            ActiveDirectory">
                1e0f3427-bbcb-474d-a532-a2ba6168c4dc
        </objectReferenceProperty>
        <instance xmlns="http://schemas.microsoft.com/2008/1/
        ActiveDirectory">
            ldap:389
        </instance>
        <wsa:MessageID>
            urn:uuid:720f1d9c-5181-42c8-91ab-3deef105d0ff
        </wsa:MessageID>
        <wsa:ReplyTo>
            <wsa:Address>
                http://www.w3.org/2005/08/addressing/anonymous
            </wsa:Address>
        </wsa:ReplyTo>
        <wsa:To soapenv:mustUnderstand="1">
net.tcp://server01.fabrikam.com:9389/ActiveDirectoryWebServices/
Windows/Resource
        </wsa:To>
    </soapenv:Header>
    <soapenv:Body/>
</soapenv:Envelope>
```

As the WS-Transfer get message comprises a SOAP message, the message is embodied in a SOAP envelope XML element named "soapenv:envelope". The SOAP envelope XML element includes both a SOAP header XML element named "soapenv:Header" and a SOAP body XML element named "soapenv:Body". The SOAP header XML element includes an XML element named "wsa:Action," the contents of which ("http://schemas.xmlsoap.org/ws/2004/09/transfer/Get") specifies that the operation to be performed is a WS-Transfer Get operation. The SOAP header XML element also includes an XML element named "objectReferenceProperty" that specifies the object reference property in GUID form of the directory object that is the target of the Get request.

The following is the corresponding WS-Transfer GetResponse message. Note that certain portions of this example message have been omitted for the sake of brevity. Omitted portions have been replaced with the text " . . . ".

```
<soapenv:Envelope
    xmlns:soapenv="http://www.w3.org/2003/05/soap-envelope"
    xmlns:wsa="http://www.w3.org/2005/08/addressing">
  <soapenv:Header>
    <wsa:Action soapenv:mustUnderstand="1">
      http://schemas.xmlsoap.org/ws/2004/09/transfer/GetResponse
    </wsa:Action>
    <wsa:RelatesTo>
      urn:uuid:720f1d9c-5181-42c8-91ab-3deef105d0ff
    </wsa:RelatesTo>
    <wsa:To soapenv:mustUnderstand="1">
      http://www.w3.org/2005/08/addressing/anonymous
    </wsa:To>
  </soapenv:Header>
  <soapenv:Body>
    <addata:user
  xmlns:addata="http://schemas.microsoft.com/2008/1/ActiveDirectory/Data"
  xmlns:ad="http://schemas.microsoft.com/2008/1/ActiveDirectory"
  xmlns:xsi="http://www.w3.org/2001/XMLSchema-instance"
  xmlns:xsd="http://www.w3.org/2001/XMLSchema">
      <ad:objectReferenceProperty>
        <ad:value xsi:type="xsd:string">
          1e0f3427-bbcb-474d-a532-a2ba6168c4dc
        </ad:value>
      </ad:objectReferenceProperty>
      <addata:lastLogon LdapSyntax="LargeInteger">
        <ad:value xsi:type="xsd:string">
          0
        </ad:value>
      </addata:lastLogon>
      <addata:dSCorePropagationData
            LdapSyntax="GeneralizedTimeString">
        <ad:value xsi:type="xsd:string">
          16010101000000.0Z
        </ad:value>
      </addata:dSCorePropagationData>
      <addata:objectSid LdapSyntax="SidString">
        <ad:value xsi:type="xsd:base64Binary">
          AQUAAAAAAAUVAAAAbTIi8R3L2V3ypAE4pl-
          MAAA==
        </ad:value>
      </addata:objectSid>
      ...
      <addata:name LdapSyntax="UnicodeString">
        <ad:value xsi:type="xsd:string">
          TestUser1
        </ad:value>
      </addata:name>
      ...
      <addata:objectClass LdapSyntax="ObjectIdentifier">
        <ad:value xsi:type="xsd:string">
          top
        </ad:value>
        <ad:value xsi:type="xsd:string">
          person
        </ad:value>
        <ad:value xsi:type="xsd:string">
          organizationalPerson
        </ad:value>
        <ad:value xsi:type="xsd:string">
          user
        </ad:value>
      </addata:objectClass>
      ...
      <ad:container-hierarchy-parent>
        <ad:value xsi:type="xsd:string">
          e4f8a504-d7df-4b63-a636-5642d3bf1cf6
        </ad:value>
      </ad:container-hierarchy-parent>
      <ad:relativeDistinguishedName>
        <ad:value xsi:type="xsd:string">
          CN=TestUser1
        </ad:value>
      </ad:relativeDistinguishedName>
      <ad:distinguishedName>
        <ad:value xsi:type="xsd:string">
          CN=TestUser1,DC=Fabrikam,DC=com
        </ad:value>
      </ad:distinguishedName>
    </addata:user>
  </soapenv:Body>
</soapenv:Envelope>
```

Here, the XML element denoted "wsa:Action" in the SOAP header XML element includes a string ("http://schemas.xmlsoap.org/ws/2004/09/transfer/GetResponse") that specifies that the message is a WS-Transfer GetResponse message.

The SOAP body XML element includes a representation of the requested directory object in the form of the XML element denoted "addata:user". User is the most derived structural object class of the requested directory object. The XML element "adddata:user" in turn includes a number of XML elements, each of which represents LDAP attributes of the requested directory object. These XML elements include for example, the XML elements "addata:lastLogon", "addata:dSCorePropagationData", "addata:objectSid", "addata:name" and "addata:objectClass". The XML element "addata:objectClass" is an example representation of an LDAP attribute that includes multiple values. Each of these values is included as a separate XML element within the XML element "addata:objectClass".

The XML element "addata:user" also includes a number of XML elements that represent synthetic attributes associated with the requested directory object. These XML elements include "ad:objectReferenceProperty", "ad:container-hierarchy-parent", "ad:relativeDistinguishedName" and "ad:distinguishedName". These synthetic attributes were previously described in Section C.3.

2. WS-Enumeration Pull Example

The following example illustrates a WS-Enumeration Pull operation using a previously obtained enumeration context. Both a WS-Enumeration Pull request message and a WS-Enumeration PullResponse message are shown.

The following is the WS-Enumeration Pull request message:

```
<soapenv:Envelope
    xmlns:soapenv="http://www.w3.org/2003/05/soap-envelope"
    xmlns:wsa="http://www.w3.org/2005/08/addressing">
  <soapenv:Header>
    <wsa:Action soapenv:mustUnderstand="1">
      http://schemas.xmlsoap.org/ws/2004/09/enumeration/Pull
    </wsa:Action>
    <wsa:MessageID>
      urn:uuid:b22747a9-ca15-41de-8c91-5a51bd88669c
    </wsa:MessageID>
    <wsa:ReplyTo>
      <wsa:Address>
        http://www.w3.org/2005/08/addressing/anonymous
      </wsa:Address>
    </wsa:ReplyTo>
    <wsa:To soapenv:mustUnderstand="1">
  net.tcp://server01.fabrikam.com:9389/ActiveDirectoryWebServices/
  Windows/Enumeration
    </wsa:To>
  </soapenv:Header>
  <soapenv:Body>
    <wsen:Pull
        xmlns:wsen="http://schemas.xmlsoap.org/ws/2004/09/
        enumeration"
        xmlns:xsi="http://www.w3.org/2001/XMLSchema-
        instance"
        xmlns:xsd="http://www.w3.org/2001/XMLSchema"
        xmlns:ad="http://schemas.microsoft.com/2008/1/
        ActiveDirectory">
      <wsen:EnumerationContext>
        f52c7e9d-80c2-40cd-b8c9-55bc94fc3e47
      </wsen:EnumerationContext>
```

```
            <wsen:MaxTime>
                PT10S
            </wsen:MaxTime>
            <wsen:MaxElements>
                2
            </wsen:MaxElements>
        </wsen:Pull>
    </soapenv:Body>
</soapenv:Envelope>
```

Here, the XML element denoted "wsa:Action" in the SOAP header XML element includes a string ("http://schemas.xmlsoap.org/ws/2004/09/enumeration/Pull") that specifies that the message is a WS-Enumeration Pull request message. Parameters associated with the Pull request are specified in a "wsen:Pull" XML element nested within the SOAP body XML element. These parameters include an identifier of the enumeration context that was previously obtained from a EnumerateResponse message returned by directory server 112 as specified in the "wsen:EnumerationContext" XML element, a maximum number of directory objects to be returned by directory service 104 in response to the Pull request as specified in the "wsen:MaxElements" XML element, and a limitation on how much time directory service 104 should spend processing the request as specified in the "wsen:MaxTime" XML element.

The following is the corresponding WS-Enumeration PullResponse message. Note that certain portions of this example message have been omitted for the sake of brevity. Omitted portions have been replaced with the text " . . . ".

```
<soapenv:Envelope
    xmlns:soapenv="http://www.w3.org/2003/05/soap-envelope"
    xmlns:wsa="http://www.w3.org/2005/08/addressing">
    <soapenv:Header>
        <wsa:Action soapenv:mustUnderstand="1">
            http://schemas.xmlsoap.org/ws/2004/09/enumeration/
            PullResponse
        </wsa:Action>
        <wsa:RelatesTo>
            urn:uuid:b22747a9-ca15-41de-8c91-5a51bd88669c
        </wsa:RelatesTo>
        <wsa:To soapenv:mustUnderstand="1">
            http://www.w3.org/2005/08/addressing/anonymous
        </wsa:To>
    </soapenv:Header>
    <soapenv:Body>
        <wsen:PullResponse
            xmlns:wsen="http://schemas.xmlsoap.org/ws/2004/09/
            enumeration"
            xmlns:xsi="http://www.w3.org/2001/XMLSchema-instance"
            xmlns:xsd="http://www.w3.org/2001/XMLSchema"
            xmlns:ad="http://schemas.microsoft.com/2008/1/
            ActiveDirectory"
    xmlns:addata="http://schemas.microsoft.com/2008/1/ActiveDirectory/
    Data">
            <wsen:EnumerationContext>
                d22e957c-8278-4eb9-a57f-41574c55305d
            </wsen:EnumerationContext>
            <wsen:Items>
                <addata:user>
                    <ad:objectReferenceProperty>
                        <ad:value xsi:type="xsd:string">
                            373e1409-cf88-41dc-b8ea-bdd27d54e073
                        </ad:value>
                    </ad:objectReferenceProperty>
                    <addata:name LdapSyntax="UnicodeString">
                        <ad:value xsi:type="xsd:string">
                            TestUser1
                        </ad:value>
                    </addata:name>
                    ...
                    <ad:container-hierarchy-parent>
                        <ad:value xsi:type="xsd:string">
                            41816238-95ca-48d9-9a99-3bd9ae9e0e42
                        </ad:value>
                    </ad:container-hierarchy-parent>
                    <ad:relativeDistinguishedName>
                        <ad:value xsi:type="xsd:string">
                            CN=TestUser1
                        </ad:value>
                    </ad:relativeDistinguishedName>
                    <addata:givenName LdapSyntax="UnicodeString">
                        <ad:value xsi:type="xsd:string">
                            John</ad:value>
                    </addata:givenName>
                </addata:user>
                <addata:user>
                    <ad:objectReferenceProperty>
                        <ad:value xsi:type="xsd:string">
                            51d67624-d52d-421d-a0d6-1dc350abd009
                        </ad:value>
                    </ad:objectReferenceProperty>
                    <addata:name LdapSyntax="UnicodeString">
                        <ad:value xsi:type="xsd:string">
                            TestUser2
                        </ad:value>
                    </addata:name>
                    ...
                    <ad:container-hierarchy-parent>
                        <ad:value xsi:type="xsd:string">
                            41816238-95ca-48d9-9a99-3bd9ae9e0e42
                        </ad:value>
                    </ad:container-hierarchy-parent>
                    <ad:relativeDistinguishedName>
                        <ad:value xsi:type="xsd:string">
                            CN=TestUser2
                        </ad:value>
                    </ad:relativeDistinguishedName>
                    <addata:givenName LdapSyntax="UnicodeString">
                        <ad:value xsi:type="xsd:string">
                            Robert
                        </ad:value>
                    </addata:givenName>
                </addata:user>
            </wsen:Items>
        </wsen:PullResponse>
    </soapenv:Body>
</soapenv:Envelope>
```

The XML element denoted "wsa:Action" in the SOAP header XML element includes a string ("http://schemas.xmlsoap.org/ws/2004/09/enumeration/PullResponse") that specifies that the message is a WS-Enumeration PullResponse message.

In the SOAP body XML element, attributes have been returned for two directory objects.

3. WS-Transfer Put Example

The following example illustrates a WS-Transfer Put operation. Both a WS-Transfer Put request message and a WS-Transfer PutResponse message are shown.

The following is the WS-Transfer Put request message. Note that certain portions of this example message have been omitted for the sake of brevity. Omitted portions have been replaced with the text " . . . ".

```
<soapenv:Envelope
    xmlns:soapenv="http://www.w3.org/2003/05/soap-envelope"
    xmlns:wsa="http://www.w3.org/2005/08/addressing">
    <soapenv:Header>
        <wsa:Action soapenv:mustUnderstand="1">
            http://schemas.xmlsoap.org/ws/2004/09/transfer/Put
        </wsa:Action>
```

```
    <objectReferenceProperty
            xmlns="http://schemas.microsoft.com/2008/1/
            ActiveDirectory">
        cf041608-84b9-4fd0-a83c-46d40a964b88
    </objectReferenceProperty>
    <instance xmlns="http://schemas.microsoft.com/2008/1/
    ActiveDirectory">
        ldap:389
    </instance>
    <wsa:MessageID>
        urn:uuid:e36457ff-d0f1-4c85-abe6-6cdf4bd511e9
    </wsa:MessageID>
    <wsa:ReplyTo>
        <wsa:Address>
            http://www.w3.org/2005/08/addressing/anonymous
        </wsa:Address>
    </wsa:ReplyTo>
    <wsa:To soapenv:mustUnderstand="1">
    net.tcp://server01.fabrikam.com:9389/ActiveDirectoryWebServices/
    Windows/Resource
        </wsa:To>
    </soapenv:Header>
    <soapenv:Body>
        <addata:user
    xmlns:addata="http://schemas.microsoft.com/2008/1/ActiveDirectory/
    Data"
    xmlns:ad="http://schemas.microsoft.com/2008/1/ActiveDirectory"
    xmlns:xsi="http://www.w3.org/2001/XMLSchema-instance"
    xmlns:xsd="http://www.w3.org/2001/XMLSchema">
            <addata:givenName LdapSyntax="UnicodeString">
                <ad:value xsi:type="xsd:string">
                    John
                </ad:value>
            </addata:givenName>
            <ad:container-hierarchy-parent>
                <ad:value xsi:type="xsd:string">
                    23173345-7917-4f70-9DFF-349888AFF5DB
                </ad:value>
            </ad:container-hierarchy-parent>
            <ad:relativeDistinguishedName>
                <ad:value xsi:type="xsd:string">
                    CN=John Smith</ad:value>
            </ad:relativeDistinguishedName>
            ...
            ...
        </addata:user>
    </soapenv:Body>
</soapenv:Envelope>
```

Here, the XML element denoted "wsa:Action" in the SOAP header XML element includes a string ("http://schemas.xmlsoap.org/ws/2004/09/transfer/Put") that specifies that the message is a WS-Transfer Put request message. The SOAP header XML element also includes an XML element named "objectReferenceProperty" that specifies the object reference property in GUID form of the directory object that is the target of the Put request.

The SOAP body XML element includes XML elements representing LDAP attributes that are being written to by the Put request. In this example, the client is specifying that the LDAP attribute represented by the XML element "addata:givenName" should have its value set to "John". Additionally, the synthetic attributes represented by the XML elements "ad:container-hierarchy-parent" and "ad:relativeDistinguishedName" are being written to, representing a potential move and rename, respectively, of the directory object. ("Potential" because the client could be writing the same values as the existing values, in which case no change is made to the object's name or position.)

The following is the corresponding WS-Transfer PutResponse message, which indicates that the Put request was completed successfully:

```
<soapenv:Envelope
    xmlns:soapenv="http://www.w3.org/2003/05/soap-envelope"
    xmlns:wsa="http://www.w3.org/2005/08/addressing">
    <soapenv:Header>
        <wsa:Action soapenv:mustUnderstand="1">
            http://schemas.xmlsoap.org/ws/2004/09/transfer/PutResponse
        </wsa:Action>
        <wsa:RelatesTo>
            urn:uuid:e36457ff-d0f1-4c85-abe6-6cdf4bd511e9
        </wsa:RelatesTo>
        <wsa:To soapenv:mustUnderstand="1">
            http://www.w3.org/2005/08/addressing/anonymous
        </wsa:To>
    </soapenv:Header>
    <soapenv:Body/>
</soapenv:Envelope>
```

Figure 3:
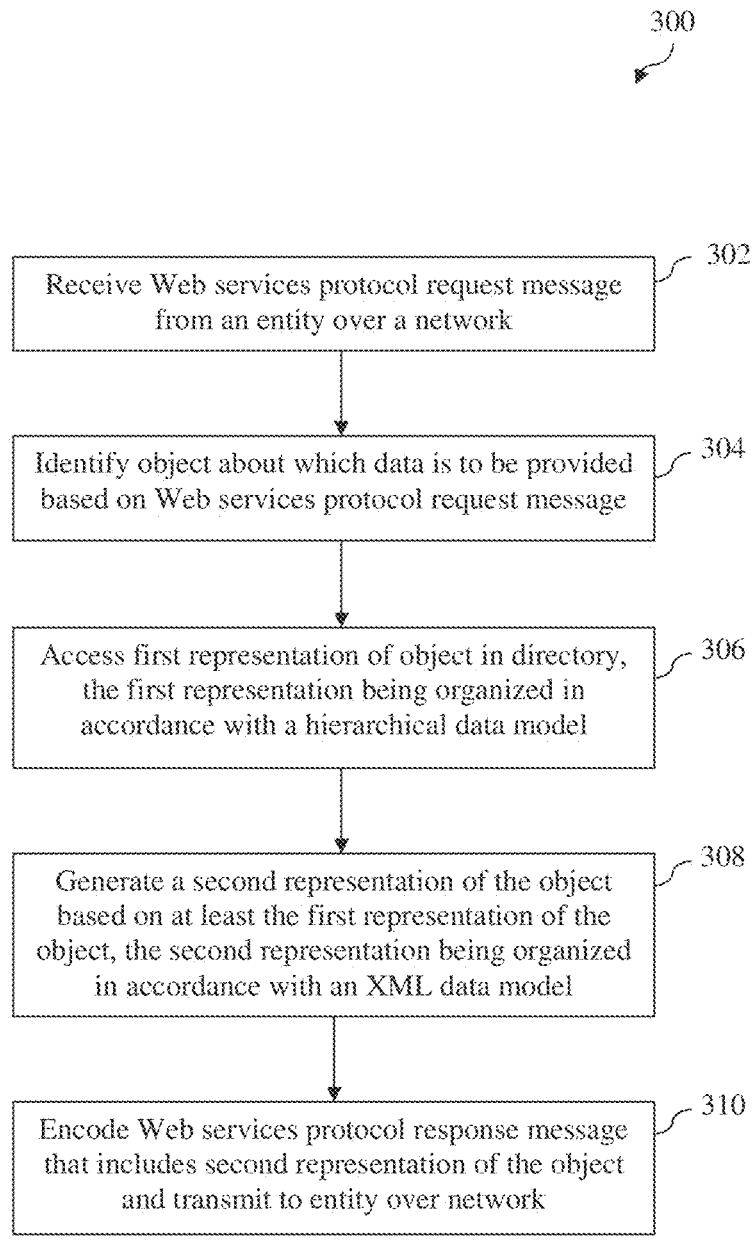
FIG. 3 depicts a flowchart of a method for using an XML data model to process Web services protocol request and response messages in accordance with an embodiment of the present invention.

E. Example Methods for Processing Web Services Protocol Request and Response Messages Using XML Data Model Example methods by which directory server 112 uses an XML data model to process Web services protocol request and response messages will now be described. In particular, FIG. 3 depicts a flowchart 300 of a method for using an XML data model to process Web services protocol request and response messages in accordance with an embodiment of the present invention. The method of flowchart 300 will now be described with continued reference to elements of system 100 as described above in reference to FIGS. 1 and 2. However, the method is not limited to that implementation.

As shown in FIG. 3, the method of flowchart 300 begins at step 302 in which server Web services interface 212 receives a Web services protocol request message from an entity, such as client 102₁, over network 106. The Web services protocol comprises a protocol for accessing resources represented using XML. In an embodiment, the Web services protocol request message comprises a WS-Transfer Get request message. In an alternate embodiment, the Web services protocol request message comprises a WS-Enumeration Pull request message. However, these are only examples and other types of request messages may be received during step 302.

At step 304, directory service logic 214 identifies an object in directory 114 about which data is to be provided based on the Web services protocol request message received during step 302. In one embodiment, directory service logic 214 identifies the object based on a unique object reference identifier that is included within an XML element that comprises part of the Web services protocol request message received during step 302.

At step 306, directory service logic 214 accesses a first representation of the object identified during step 304 in directory 114, wherein the first representation is organized in accordance with a hierarchical data model. In one embodiment, accessing the first representation of the object in directory 114 comprises using LDAP and the hierarchical data model comprises an LDAP data model. However, this is only an example, and other directory service protocols and data models may be used.

At step 308, conversion logic 216 generates a second representation of the object accessed during step 306 based on at least the first representation of the object, wherein the second representation of the object is organized in accordance with an XML data model. The XML data model may be, for example, the XML data model described above in Section C.

At step 310, server Web services interface 212 encodes a Web services protocol response message that includes the second representation of the object generated by conversion logic 216 during step 308 and transmits the Web services protocol response message to the entity over network 106. In an embodiment, the Web services protocol response message comprises a WS-Transfer GetResponse message. In an alternate embodiment, the Web services protocol response message comprises a WS-Enumeration PullResponse message. However, these are only examples and other types of response messages may be encoded and transmitted during step 310.

Figure 4:
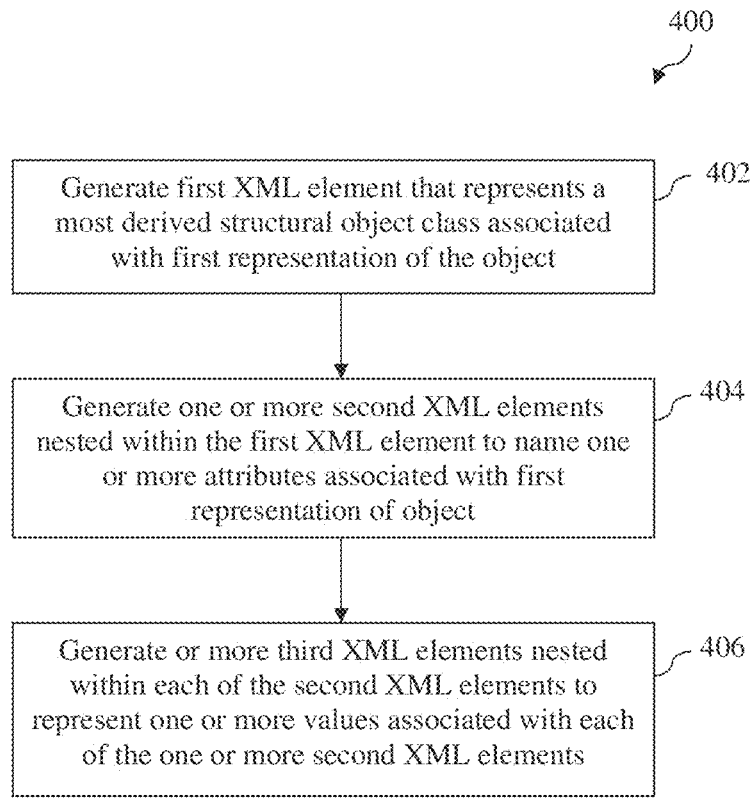
FIG. 4 depicts a flowchart of a method for generating a representation of a directory object organized in accordance with an XML data model based at least on a representation of the directory object organized in accordance with a hierarchical data model in accordance with an embodiment of the present invention.

FIG. 4 depicts a flowchart 400 of one example method for performing step 308 of FIG. 3. As shown in FIG. 4, the method of flowchart 400 begins at step 402, in which conversion logic 216 generates a first XML element that represents a most derived structural object class associated with the first representation of the object accessed during step 306. One example of such a first XML element is the XML element <addata:C> described above in reference to the example XML data model of Section C.2.

At step 404, conversion logic 216 generates one or more second XML elements nested within the first XML element to name one or more corresponding attributes associated with the first representation of the object accessed during step 306. One example of such one or more second XML elements are the XML elements <addata:A1>, . . . <addata:An> nested within the XML element <addata:C> as described above in reference to the example XML data model of Section C.2. Depending upon the implementation, generating the one or more second XML elements may comprise including a syntax attribute within each of the one or more second XML elements that specifies a syntax associated with the attribute represented by the second XML element. One example of such a syntax attribute is the LdapSyntax attribute provided as part of each of the XML elements <addata:A1>, . . . <addata:An> as described above in Section C.2.

At step 406, conversion logic 216 generates one or more third XML elements nested within each of the second XML elements to represent one or more corresponding values associated with each of the one or more second XML elements generated during step 404. One example of such one or more third XML elements are the multiple XML elements <ad:value> containing the values S1(A1), . . . Sn(A1) that are nested within the XML element <addata:A1> as described above in reference to the example XML data model of Section C.2

Figure 5:
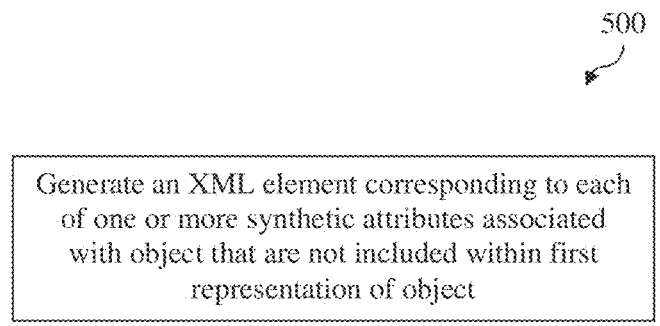
FIG. 5 depicts a step that may be performed in generating a representation of a directory object organized in accordance with an XML data model based at least on a representation of the directory object organized in accordance with a hierarchical data model in accordance with an embodiment of the present invention.

FIG. 5 depicts an additional step 500 that may be performed in carrying out step 308 of FIG. 3. This step may be performed, for example, in addition to the foregoing steps of the method of flowchart 400 to carry out step 308 of FIG. 3. As shown in FIG. 5, during step 500, conversion logic 216 generates an XML element corresponding to each of one or more synthetic attributes associated with the object accessed during step 306, wherein the synthetic attributes are not included within the first representation of the object. The synthetic attributes may be, for example, any of the object reference property, container-hierarchy-parent, distinguished name and relative distinguished name synthetic attributes discussed above in Section C.3.

Figure 6:
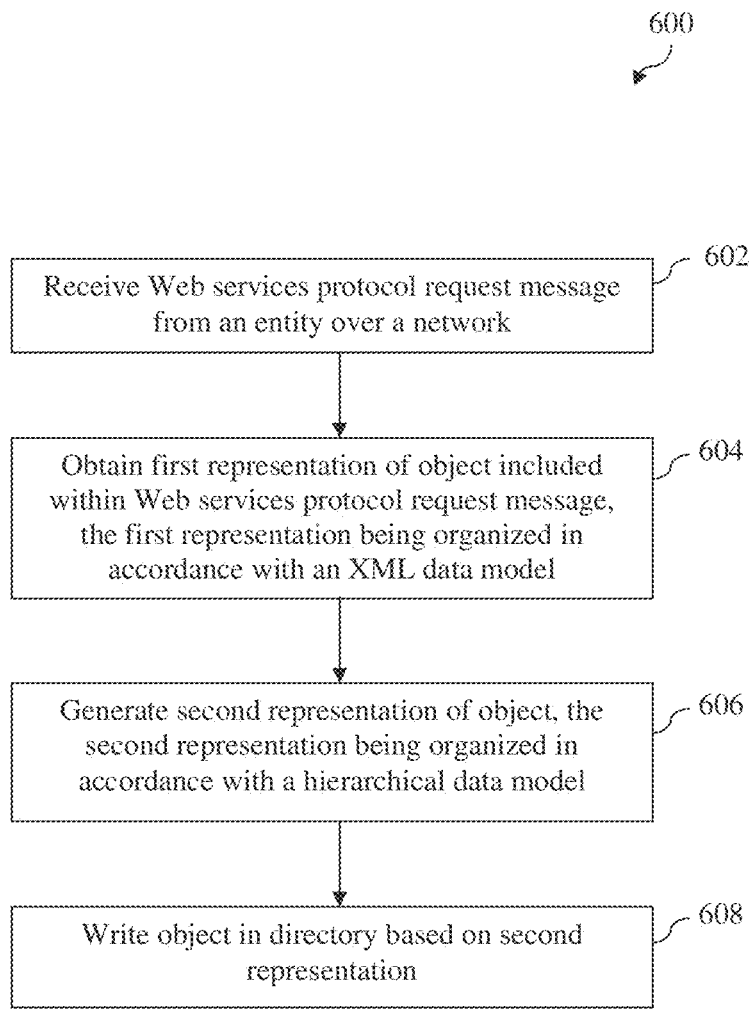
FIG. 6 depicts a flowchart of a method for using an XML data model to process a Web services protocol request message in accordance with an embodiment of the present invention.

FIG. 6 depicts a flowchart 600 of a method for using an XML data model to process a Web services protocol request message in accordance with an embodiment of the present invention. The method of flowchart 600 will now be described with continued reference to elements of system 100 as described above in reference to FIGS. 1 and 2. However, the method is not limited to that implementation.

As shown in FIG. 6, the method of flowchart 600 begins at step 602, during which server Web services interface 212 receives a Web services protocol message from an entity, such as client 1021, over network 106. The Web services protocol comprises a protocol for accessing resources represented using XML. In an embodiment, the Web services protocol request message comprises a WS-Transfer Put request message. In an alternate embodiment, the Web services protocol request message comprises a WS-Transfer Create request message. However, these are only examples and other types of request messages may be received during step 602.

At step 604, conversion logic 216 obtains a first representation of an object included within the Web services protocol request message, wherein the first representation of the object is organized in accordance with an XML data model. The XML data model may be, for example, the XML data model described above in Section C.

At step 606, conversion logic 216 generates a second representation of the object, wherein the second representation of the object is organized in accordance with a hierarchical data model. In one embodiment, the hierarchical data model comprises an LDAP data model.

At step 608, directory service logic 214 writes the object in directory 114 based on the second representation of the object. Writing the object in directory 114 may comprise creating a new object in directory 114 or modifying an existing object in directory 114. In one embodiment, writing the object in directory 114 comprises using LDAP to perform the write.

Figure 7:
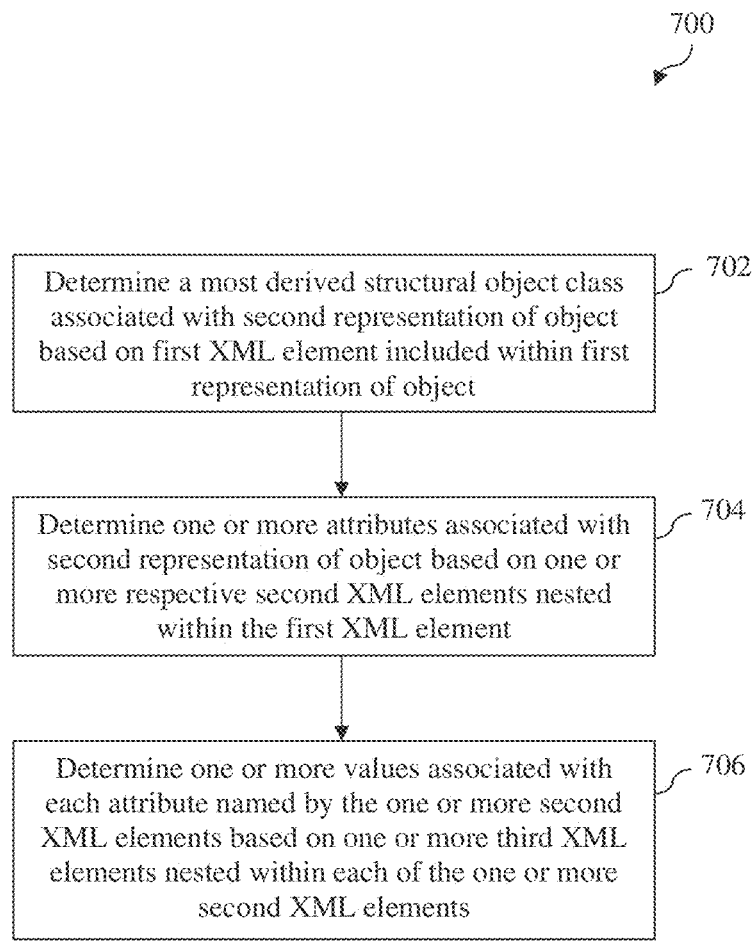
FIG. 7 depicts a flowchart of a method for generating a representation of a directory object organized in accordance with a hierarchical data model based at least on a representation of the directory object organized in accordance with an XML data model in accordance with an embodiment of the present invention.

FIG. 7 depicts a flowchart 700 of one example method for performing step 606 of FIG. 6. As shown in FIG. 7, the method of flowchart 700 begins at step 702, in which conversion logic 216 determines a most derived structural object class associated with the second representation of the object based on a first XML element included within the first representation of the object obtained during step 604. One example of such a first XML element is the XML element <addata:C> described above in reference to the example XML data model of Section C.2.

At step 704, conversion logic 216 determines one or more attributes associated with the second representation of the object based on one or more respective second XML elements nested within the first XML element. One example of such one or more second XML elements are the XML elements <addata:A1>, . . . <addata:An> nested within the XML element <addata:C> as described above in reference to the example XML data model of Section C.2. The method of flowchart 700 may further include the step of determining a syntax associated with each attribute determined during step 704 based on a syntax attribute include within each second XML element. One example of such a syntax attribute is the LdapSyntax attribute provided as part of each of the XML elements <addata:A1>, . . . <addata:An> as described above in Section C.2.

At step 706, conversion logic 216 determines one or more values associated with each attribute named by the one or more second XML elements based on one or more third XML elements nested within each of the one or more second XML elements. One example of such one or more third XML elements are the multiple XML elements <ad:value> containing the values S1(A1), . . . Sn(A1) that are nested within the XML element <addata:A1> as described above in reference to the example XML data model of Section C.2

FIG. 8 depicts a step 800 that may be optionally be performed in addition to the steps of flowchart 600 as part of processing a Web services protocol request message. As shown in FIG. 8, during step 800, directory services logic 214 writes a relative distinguished name associated with the object represented in the Web services protocol request message based on an XML element included within the first representation of the object. This step advantageously allows the object to be named or renamed using standard Web Services protocol request messages such as a WS-Transfer Create request message or a WS-Transfer Put request message.

FIG. 9 depicts a step 900 that may be optionally be performed in addition to the steps of flowchart 600 as part of processing a Web services protocol request message. As shown in FIG. 9, during step 900, directory services logic 214 places or moves an object represented in the Web services protocol request message within a tree structure of directory 114 based on an XML element included within the first representation of the object, wherein the XML element represents an identifier that is associated with the object. The identifier may be specified, for example, as the contents of an XML element that names the container-hierarchy-parent attribute. This step advantageously allows the object to be placed or moved within directory 114 using standard Web Services protocol request messages such as a WS-Transfer Create request message or a WS-Transfer Put request message.

F. Example Computer System Implementation

Figure 10:
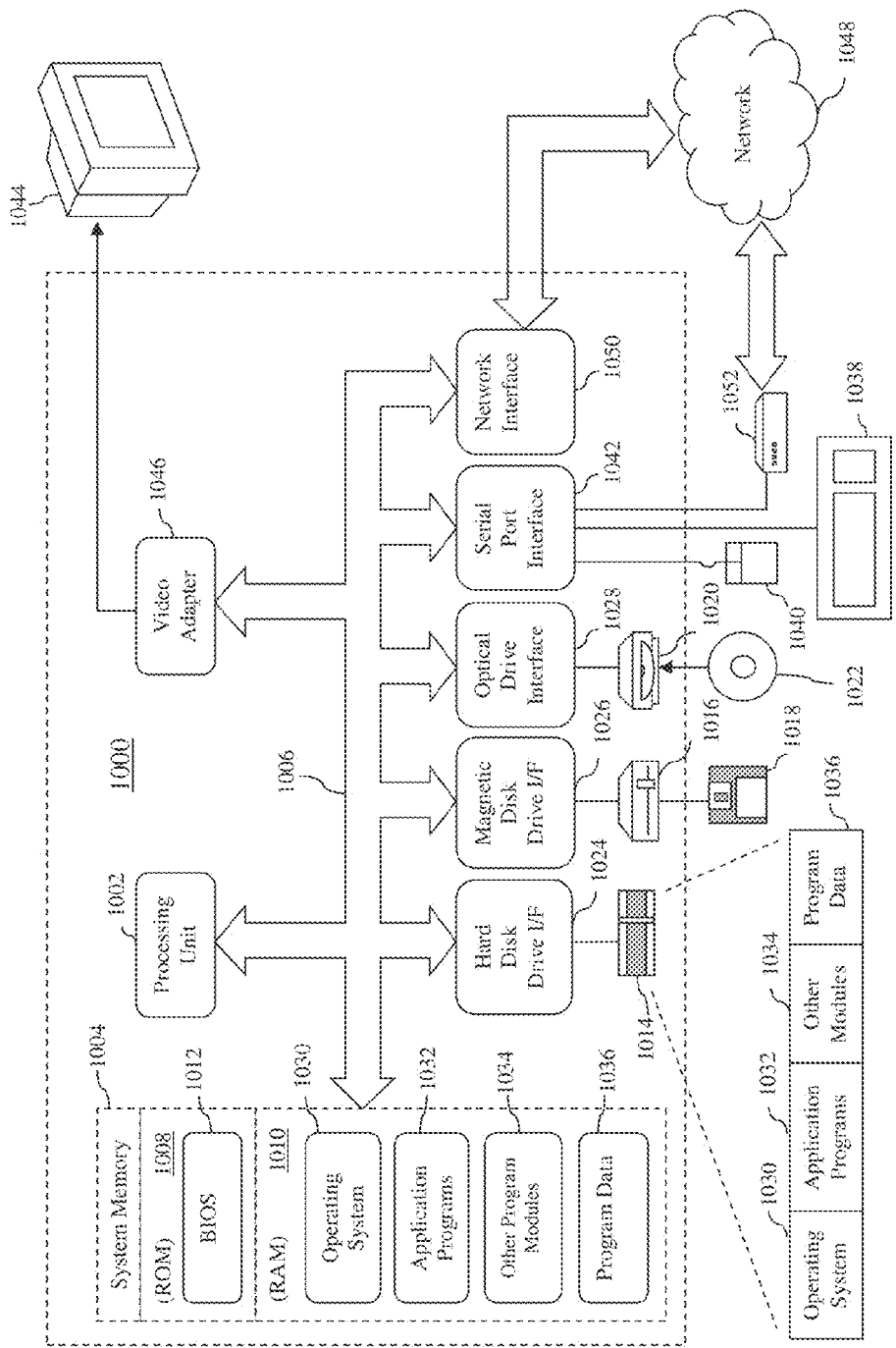
FIG. 10 depicts an example processor-based computer system that may be used to implement various aspects of the present invention.

FIG. 10 depicts an exemplary implementation of a computer system 1000 upon which various aspects of the present invention may be executed. Computer system 1000 is intended to represent a general-purpose computing system in the form of a conventional personal computer. Computer system 1000 may be used to implement, for example, any one of clients $102_1$-$102_N$ or directory server 112, each of which was described above in reference to FIGS. 1 and 2, or any sub-components thereof.

As shown in FIG. 10, computer system 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer system 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, logic for implementing any or all of the elements of clients $102_1$-$102_N$ or directory server 112 as described above in reference to FIGS. 1 and 2. Application programs 1032 or program modules 1034 may also include, for example, logic for implementing one or more of the steps of the flowcharts depicted in FIGS. 3-9. Thus each step illustrated in those figures is also intended to represent program logic configured to perform the function described by that step.

A user may enter commands and information into computer 1000 through input devices such as keyboard 1038 and pointing device 1040. Other input devices (not shown) may include a microphone, joystick, game pad, satellite dish, scanner, or the like. These and other input devices are often connected to the processing unit 1002 through a serial port interface 1042 that is coupled to bus 1006, but may be connected by other interfaces, such as a parallel port, game port, or a universal serial bus (USB).

A monitor 1044 or other type of display device is also connected to bus 1006 via an interface, such as a video adapter 1046. Monitor 1044 is used to present a GUI that assists a user/operator in configuring and controlling computer 1000. In addition to the monitor, computer 1000 may include other peripheral output devices (not shown) such as speakers and printers.

Computer 1000 is connected to a network 1048 (e.g., a WAN such as the Internet or a LAN) through a network interface 1050, a modem 1052, or other means for establishing communications over the network. Modem 1052, which may be internal or external, is connected to bus 1006 via serial port interface 1042, but may be connected by other interfaces, such as a parallel port, game port, or a universal serial bus (USB).

As used herein, the terms "computer program medium" and "computer-readable medium" are used to generally refer to media such as the hard disk associated with hard disk drive 1014, removable magnetic disk 1018, removable optical disk 1022, as well as other media such as flash memory cards, digital video disks, random access memories (RAMs), read only memories (ROM), and the like.

As noted above, computer programs (including application programs 1032 and other program modules 1034) may be stored on the hard disk, magnetic disk, optical disk, ROM, or RAM. Such computer programs may also be received via network interface 1050 or serial port interface 1042. Such computer programs, when executed, enable computer 1000 to implement features of the present invention discussed herein. Accordingly, such computer programs represent controllers of computer 1000.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

G. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computer-implemented method for providing an object responsive to receiving a Web services protocol request message from an entity over a network, the Web services protocol for accessing resources represented using extensible markup language (XML), the method comprising:
    accessing a first representation of an object in a directory, the first representation of the object being organized in accordance with a hierarchical data model;
    generating a second representation of the object based on at least the first representation of the object, the second representation of the object being organized in accordance with an XML data model in a first XML namespace, by at least
        generating a first XML element that represents a most derived structural object class associated with the first representation of the object, and
        generating one or more second XML elements nested within the first XML element, each of the one or more second XML elements naming a respective attribute associated with the first representation of the object;
        generating an XML element corresponding to each of one or more synthetic attributes associated with the object that are not included within the first representation of the object, wherein the one or more synthetic attributes have names that are in a different XML namespace than the first XML namespace, and wherein at least one of the one or more synthetic attributes comprises an object reference property of a parent object of the object in the directory, the object reference property comprising an Lightweight Directory Access Protocol (LDAP) distinguished name of the parent of the object; and
    transmitting a Web services protocol response message including the second representation of the object to the entity over the network;
    wherein the Web services protocol request message comprises one of:
        a Web Services Transfer (WS-Transfer) Get request message;
        a Web Services Transfer (WS-Transfer) Put request message; and
        a Web Services Transfer (WS-Transfer) Create request message.

2. The method of claim 1, wherein accessing a first representation of the object in a directory comprises accessing the first representation of the object using a Lightweight Directory Access Protocol.

3. The method of claim 1, wherein generating each of the one or more second XML elements comprises:
    including a syntax attribute within each of the one or more second XML elements that specifies a syntax associated with the attribute named by the second XML element.

4. The method of claim 1, wherein generating the second representation of the object based on at least the first representation of the object further comprises:
    generating one or more third XML elements nested within one of the one or more second XML elements, each of the one or more third XML elements representing a value associated with the attribute named by the one of the one or more second XML elements.

5. The method of claim 1, wherein at least a second of the one or more synthetic attributes further comprise one or more of: an object reference property associated with the object, a distinguished name of the object, and a relative distinguished name of the object.

6. The method of claim 1, further comprising placing or moving the object within a tree structure of the directory based on an XML element included within the first representation of the object, wherein the XML element represents an identifier that is associated with the object.

7. The method of claim 1, wherein the Web services protocol request message comprises the Web Services Transfer (WS-Transfer) Put request message.

8. The method of claim 1, wherein the Web services protocol request message comprises the Web Services Transfer (WS-Transfer) Create request message.

9. The method of claim 1, further comprising writing a relative distinguished name associated with the object in the directory based on an XML element included within the first representation of the object.

10. A computer-implemented method for writing an object responsive to receiving a Web services protocol request message from an entity over a network, the Web services protocol for accessing resources represented using extensible markup language (XML), the method comprising:
    obtaining a first representation of the object included within the Web services protocol request message, the first representation of the object being organized in accordance with an XML data model in a first XML namespace;
    generating a second representation of the object based on the first representation of the object, the second representation of the object being organized in accordance with a hierarchical data model, by at least
        determining a derived structural object class associated with the second representation of the object based on a first XML element included within the first representation of the object, and
        determining one or more attributes associated with the second representation of the object named by one or more respective second XML elements nested within the first XML element;
        determining an XML element corresponding to one or more synthetic attributes associated with the object that are not included within the first representation of the object, wherein the one or more synthetic attributes have names that are in a different XML namespace than the first XML namespace, and wherein at least one of the one or more synthetic attributes comprises an object reference property of a parent object of the object, the object reference property comprising an Lightweight Directory Access Protocol (LDAP) distinguished name of the parent of the object; and
    writing the object in a directory based on the second representation of the object;
    wherein the Web services protocol request message comprises one of:
        a Web Services Transfer (WS-Transfer) Get request message;
        a Web Services Transfer (WS-Transfer) Put request message; and
        a Web Services Transfer (WS-Transfer) Create request message.

11. The method of claim 10, wherein the Web services protocol request message comprises the Web Services Transfer (WS-Transfer) Put request message.

12. The method of claim 10, wherein the Web services protocol request message comprises the Web Services Transfer (WS-Transfer) Create request message.

13. The method of claim 10, wherein writing the object in the directory comprises accessing the directory using a Lightweight Directory Access Protocol.

14. The method of claim 10, wherein generating the second representation of the object based on the first representation of the object further comprises:
determining a syntax associated with one of the one or more attributes associated with the second representation of the object based on a syntax attribute included within a corresponding one of the one or more second XML elements.

15. The method of claim 14, wherein generating the second representation of the object based on the first representation of the object further comprises:
determining one or more values associated with an attribute named by one of the one or more second XML elements based on one or more third XML elements nested within the one of the one or more second XML elements.

16. The method of claim 10, further comprising:
writing a relative distinguished name associated with the object in the directory based on an XML element included within the first representation of the object.

17. The method of claim 10, further comprising:
placing or moving the object within a tree structure of the directory based on an XML element included within the first representation of the object, wherein the XML element represents an identifier that is associated with the object.

18. A system comprising:
a computing device, the computing device further comprising:
a processor; and
a memory communicatively coupled to the processor, the memory having computer-executable instructions that when executed by the processor, provide:
a Web services interface configured to receive a first Web services protocol request message from an entity over a network, the Web services protocol for accessing resources represented using extensible markup language (XML) in a first XML namespace;
directory service logic, at the computing device, configured to access a first representation of the first object identified in the first Web services protocol request message in the Lightweight Directory Access Protocol (LDAP) directory, the first representation of the first object being organized in accordance with a hierarchical data model;
conversion logic, at the computing device, configured to generate a second representation of the first object based on at least the first representation of the first object, the second representation of the first object including a first XML element that represents a most derived structural object class associated with the first representation of the first object, one or more second XML elements nested within the first XML element, each of the one or more second XML elements naming a respective attribute associated with the first representation of the first object, and one or more third XML elements corresponding to each of one or more synthetic attributes associated with the object that are not included within the first representation of the object, wherein the one or more synthetic attributes have names that are in a different XML namespace than the first XML namespace, and wherein at least one of the one or more synthetic attributes comprises an object reference property of a parent object of the first object, the object reference property comprising an LDAP distinguished name of the parent of the object; and
wherein the Web services interface is further configured to transmit a Web services protocol response message including the second representation of the first object to the entity over the network;
wherein the Web services protocol request message comprises one of:
a Web Services Transfer (WS-Transfer) Get request message;
a Web Services Transfer (WS-Transfer) Put request message; and
a Web Services Transfer (WS-Transfer) Create request message.

19. The system of claim 18,
wherein the Web services interface is further configured to receive a second Web services protocol request message from the entity over the network;
wherein the conversion logic is further configured to obtain a first representation of a second object included within the second Web services protocol request, the first representation of the second object being organized in accordance with the XML data model, and to generate a second representation of the second object organized in accordance with the hierarchical data model by at least determining a most derived structural object class associated with the second representation of the second object based on a first XML element included within the first representation of the second object and determining one or more attributes associated with the second representation of the second object named by one or more respective second XML elements nested within the first XML element included within the first representation of the second object; and
wherein the directory service logic is further configured to write the second object in the LDAP style directory based on the second representation of the object.

20. The system of claim 19, wherein the second Web services protocol request message comprises one of a second Web Services Transfer (WS-Transfer) Put request message or a second WS-Transfer Create request message.

* * * * *